Sept. 6, 1927.  
F. E. JONES  
1,641,589  
HOSIERY MACHINE FOR MAKING RIGHT AND LEFT TOE POCKETS  
Filed March 8, 1919   7 Sheets-Sheet 1

Inventor:  
Frank E. Jones,  
by Emery, Booth, Janney and Varney,  
Attys.

Inventor:
Frank E. Jones,

Sept. 6, 1927.  1,641,589
F. E. JONES
HOSIERY MACHINE FOR MAKING RIGHT AND LEFT TOE POCKETS
Filed March 8, 1919   7 Sheets-Sheet 4
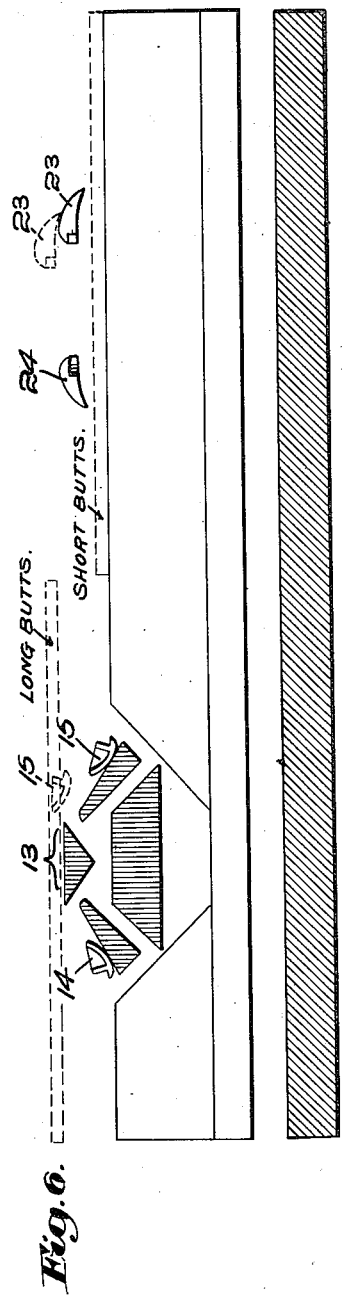
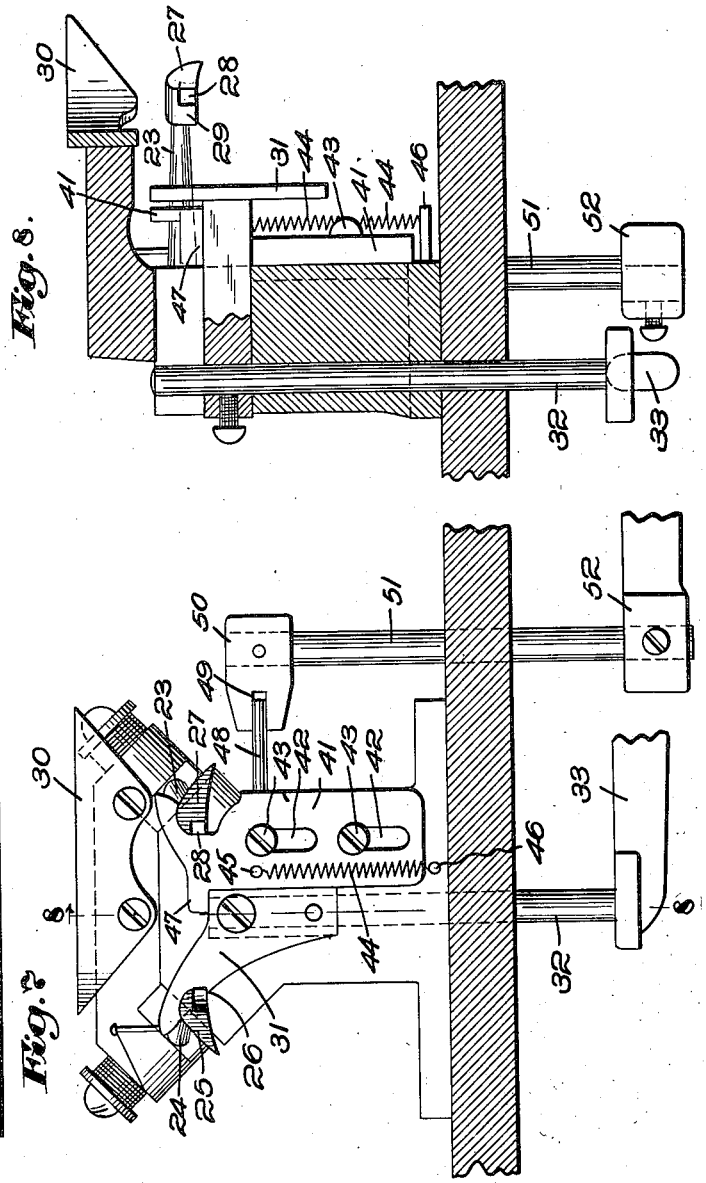
Inventor:
Frank E. Jones,
by Emery, Booth, Janney and Varney
Attys.

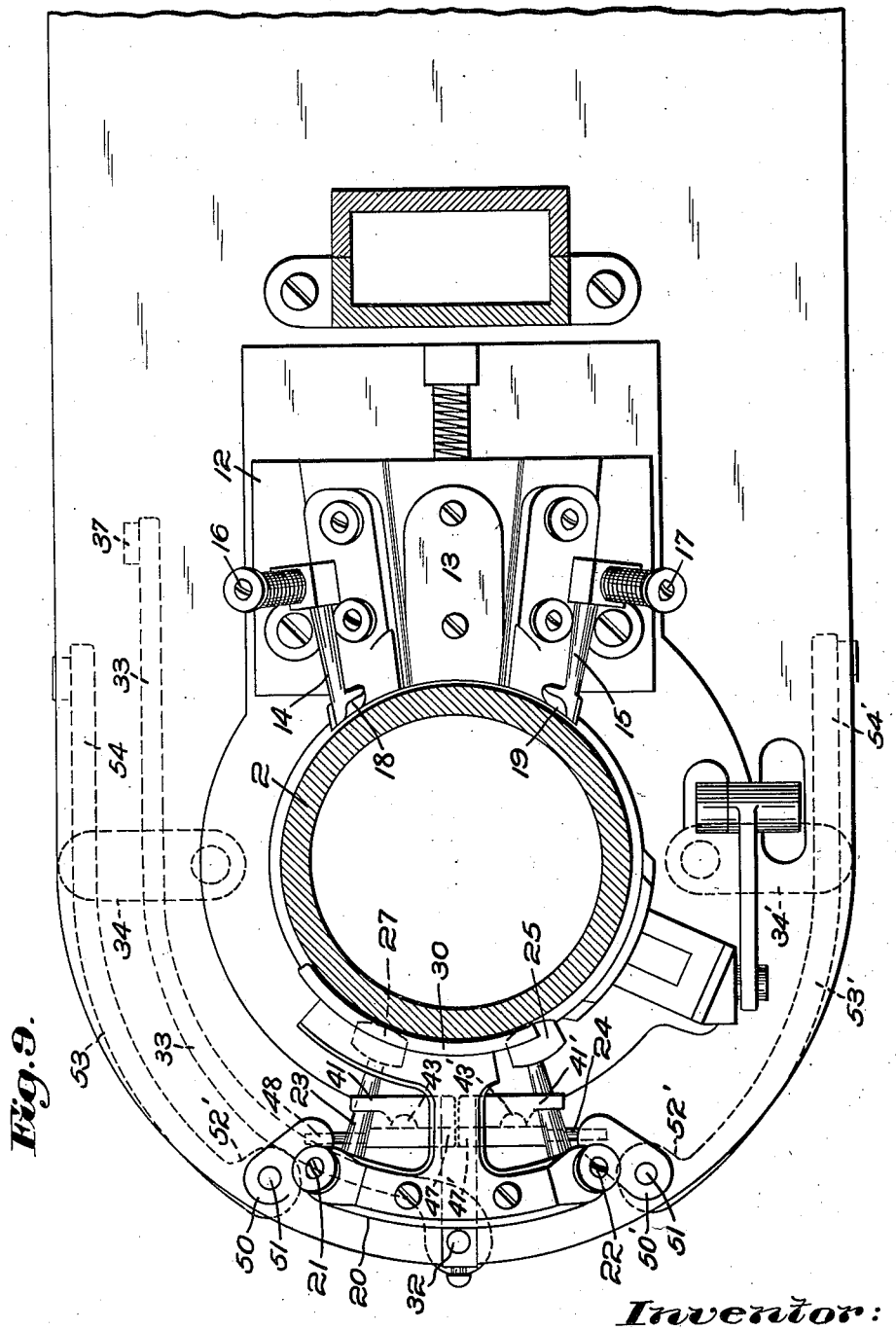

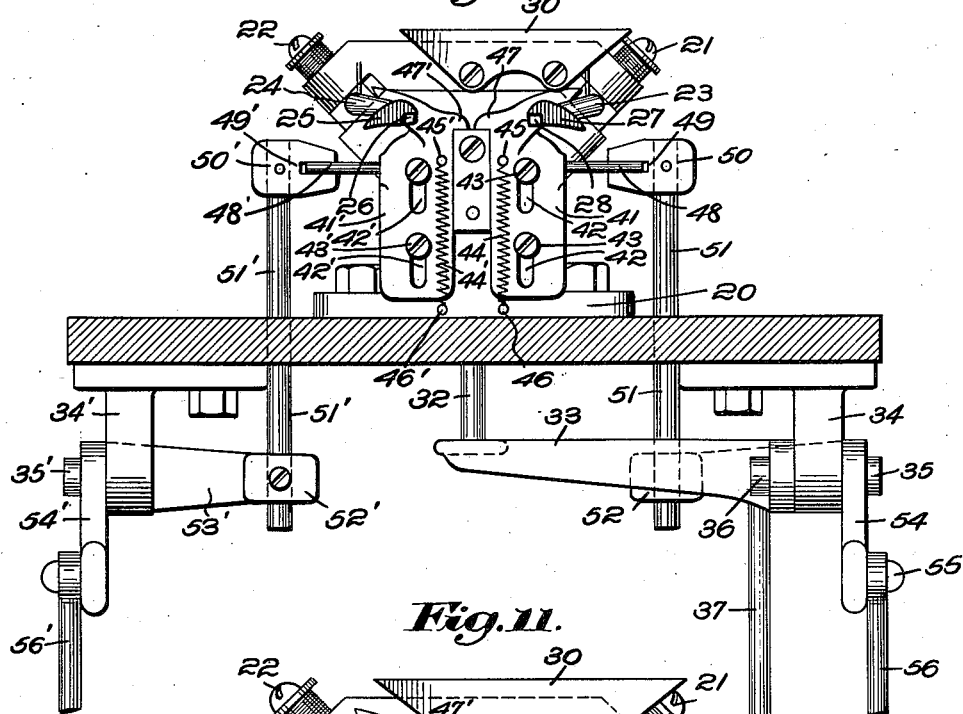
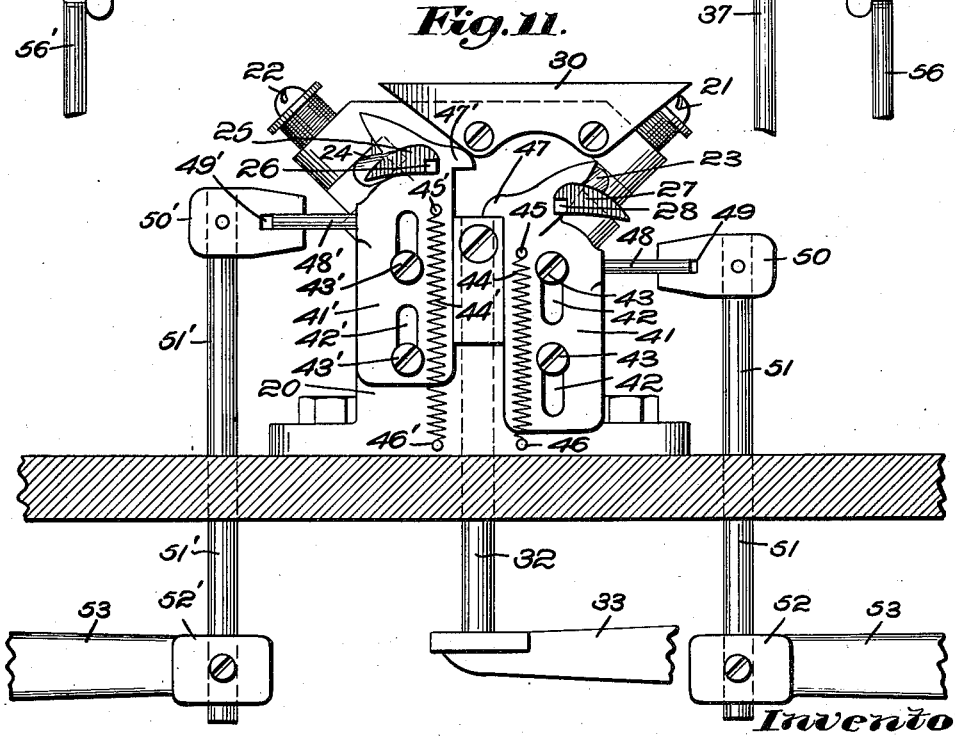

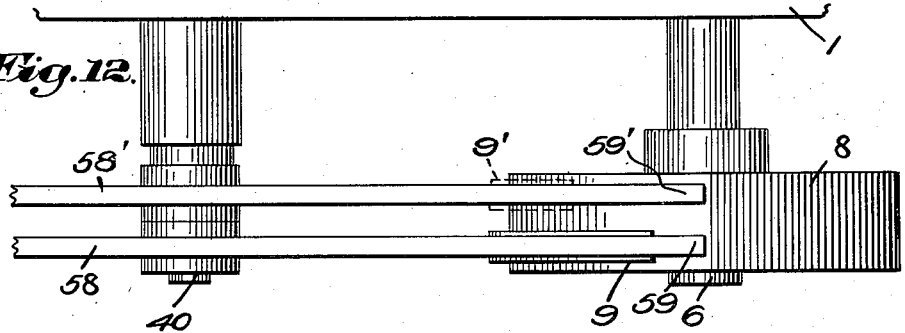
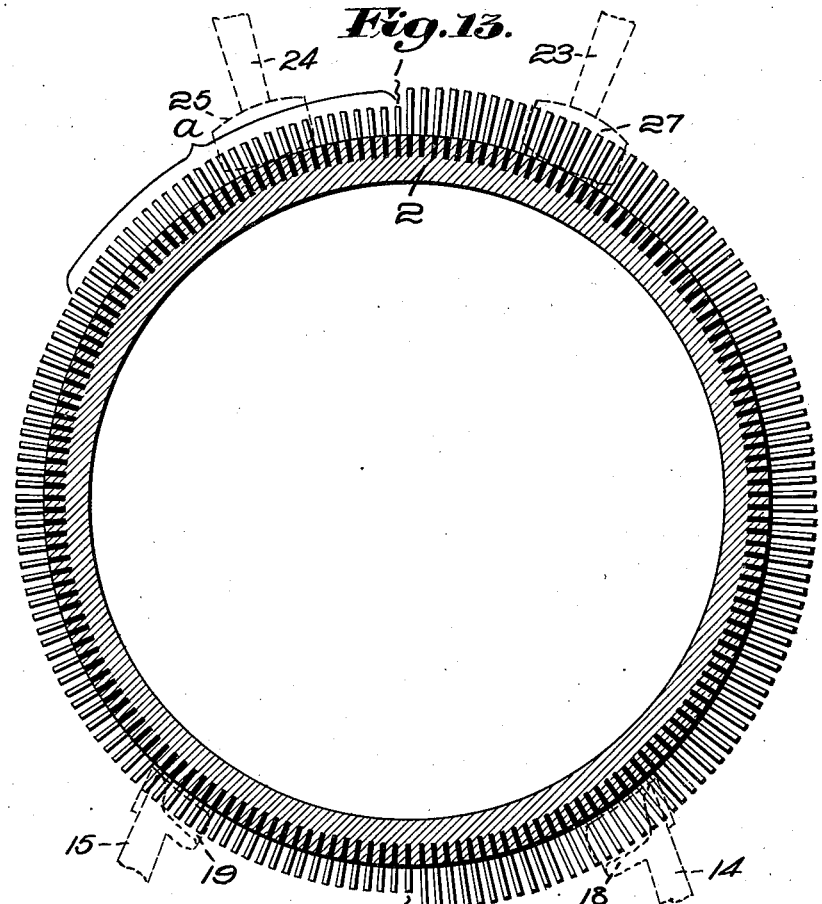

Patented Sept. 6, 1927.

1,641,589

UNITED STATES PATENT OFFICE.

FRANK E. JONES, OF PAWTUCKET, RHODE ISLAND, ASSIGNOR TO HEMPHILL COMPANY, OF CENTRAL FALLS, RHODE ISLAND, A CORPORATION OF MASSACHUSETTS.

HOSIERY MACHINE FOR MAKING RIGHT AND LEFT TOE POCKETS.

Application filed March 8, 1919. Serial No. 281,350.

This invention relates to hosiery machines for making socks or stockings with right and left toe pockets or either of them. In order that the principle of the invention may be readily understood, I have disclosed a single embodiment of means for practicing my invention, in the accompanying drawings, wherein—

Fig. 6 is a development of the knitting cams and of the narrowing and widening pickers preferably employed in the practice of my invention;

Fig. 7 is an elevation from the inside of the needle cylinder of the widening picker block and the means for positioning the widening pickers;

Fig. 8 is a section on the line 8—8, Fig. 7;

Fig. 9 is a view similar to Fig. 3 but representing a modified form of my invention and whereby either a right hand or a left hand toe pocket may be knitted;

Fig. 10 is a view similar to Fig. 4, but of the modified form of my invention shown in Fig. 9;

Fig. 11 is an enlarged detail in elevation of the widening pickers and the support thereof for knitting stockings having left hand toe pockets;

Fig. 12 is a plan view of the lower portion of the hosiery machine and particularly showing means whereby the cam mechanism may be adjusted or changed so as to knit either a right hand or a left hand toe pocket; and Fig. 13 is a diagram of the needles and indicating those acted upon in the formation of the toe pocket.

My invention in its disclosed embodiment comprehends mechanism of any suitable type or character for knitting a stocking or hose, the toe portion whereof is shaped preferably by narrowing and widening at one side thereof, namely, at the little toe side of the foot, but is non-fashioned at the opposite or great toe side of the toe pocket. My invention also and more broadly comprehends means for fashioning a knitted fabric at one edge only thereof and preferably by a narrowing and widening operation.

My invention may be carried out on any suitable type of knitting machine. I have, however, chosen to illustrate it as applied to and incorporated in a knitting machine of the so-called Banner type, such, for example, as shown in the U. S. patent to Hemphill No. 933,443, September 7, 1909, and the U. S. patent to Busek, No. 1,204,404, November 14, 1916. My invention peculiarly cooperates with that general type of machine shown in said patents, but obviously is not limited in application thereto.

In that form of my invention shown in Figs. 1 to 8 inclusive, I have represented a knitting machine adapted to make a right stocking or sock, that is, a stocking or sock, the toe pocket whereof is shaped at the little toe side thereof but not at the great toe side thereof. In that form of my invention shown in Figs. 9 to 12, I have represented means whereby through change or adjustment in the location of a controlling cam or of other parts, either a right or a left stocking or sock may be knitted.

In Figs. 1 to 8, I have shown more or less diagrammatically certain parts of a hosiery machine of the Banner type and which it is unnecessary to describe in detail. Therein I have represented the framing at 1, the needle cylinder at 2, the pivoted latch ring at 3, the supporting post therefor at 4 and the sinker ring at 5. These may be of any suitable construction. I have represented at 6 a shaft to support the usual pattern or cam drums, one of which is indicated at 7, and upon said drum I fixedly position a supplemental or additional disk 8 provided with a peripheral cam 9 for controlling the operative parts, to which my invention more particularly relates. Through the instrumentality of the pattern or cam drum 7 and the bracket 10, the vertical position of the cam ring is preferably controlled in the usual manner not herein necessary to describe.

Figure 1:
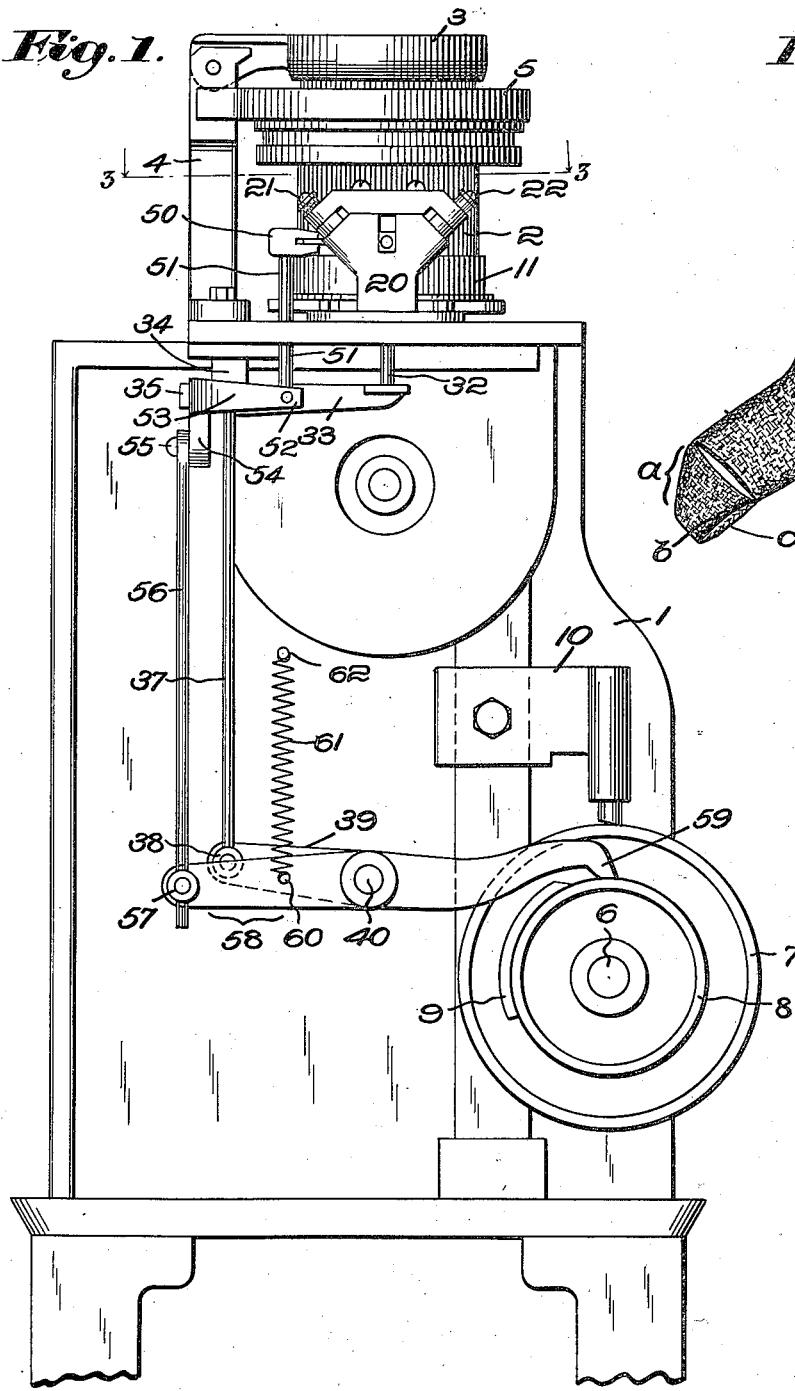
Fig. 1 is an end elevation of a hosiery machine for practicing my invention.

Without in any sense limiting myself thereto, I will describe my invention with reference to one form or type of narrowing and widening picker mechanism. As shown most clearly in Fig. 3, the cam ring, a portion whereof is indicated at 11 in Fig. 1, is provided with a cam block 12, which may be mounted for movement radially into and out of operative position in a manner not herein necessary to describe. Upon said cam block are mounted the usual stitch or knitting cams, indicated generally at 13 in Fig. 6, and which need not be described in detail and which may be of any suitable character. Upon said cam block 12 are mounted in any suitable manner two narrowing pickers 14, 15, which may be of the general type shown in the said patents or other patents of the so-called Banner machine, or of any other suitable type or character. The said pickers are here shown as pivoted at 16, 17, and as having notched inner ends 18, 19, which are adapted to engage the end needles at the two ends respectively of the series of needles remaining in action during the formation of the heel and toe pockets and to elevate them one by one out of action. Preferably, but not necessarily, the said narrowing pickers are so constructed and operated that each one of them elevates or moves out of action a short butt needle, not only during the narrowing of the heel or toe, but also during the widening thereof, since the widening pickers are preferably constructed to bring down into action two short butt needles at each operation. In other words, each narrowing picker lifts a needle out of action but immediately thereafter the proper widening picker brings down two needles into action, thus widening the fabric to the extent of one needle. Obviously my invention is not limited to use in connection with picker mechanism operating in the described manner.

In the disclosed embodiment of my invention, I provide long and short butt needles, the long butt needles being arranged in a substantially semi-circular series and constituting the in-step needles which are elevated out of action at the completion of the ankle and as a preliminary to the formation of the heel by the narrowing and widening process. Similarly the long butt needles are elevated as a preliminary to the forming of the toe pocket. The heel and the toe pockets are formed by and upon the short butt needles.

Figure 4:
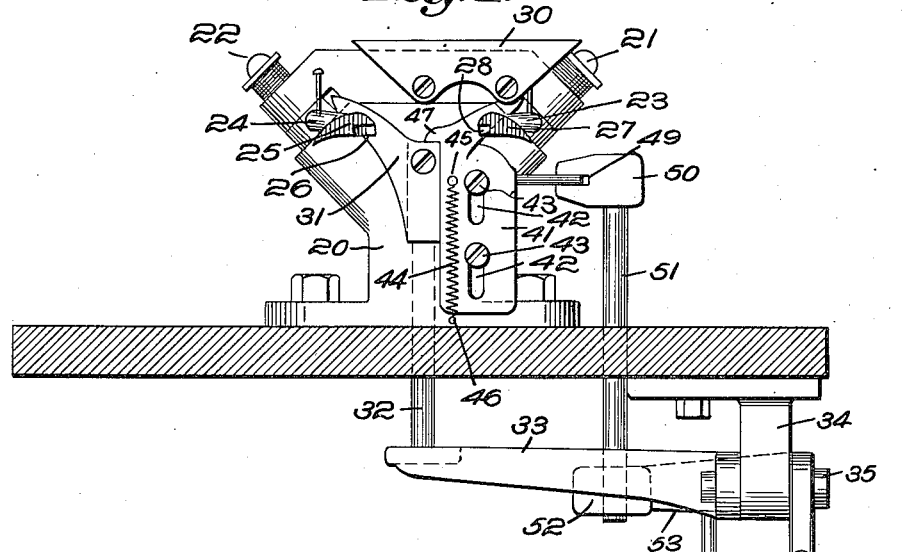
Fig. 4 is a section upon the line 4—4 of Fig. 3 and looking outwardly in said figure.
Figure 5:
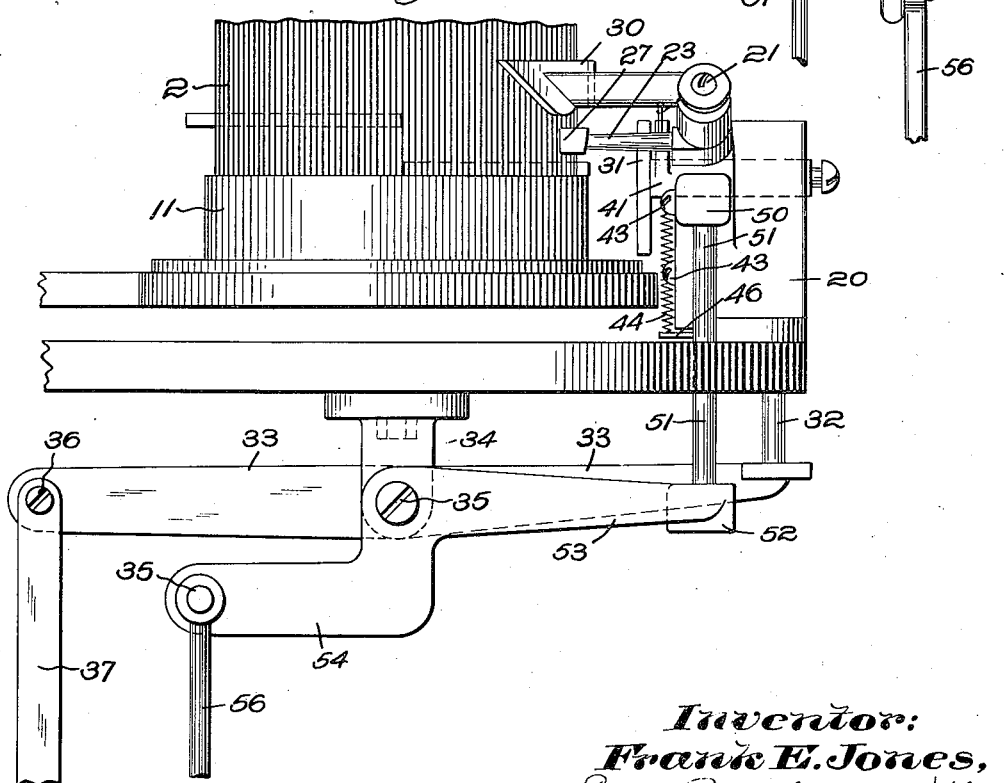
Fig. 5 is a view of the mechanism shown in Fig. 4 and looking toward the left in said figure.

As shown more particularly in Figs. 1 and 4, the cam ring is provided with a bracket 20 whereon are pivotally supported at 21, 22 the two widening pickers 23, 24. The widening picker 24 is provided with a head 25 of usual construction; that is to say, it is provided with a notch or shoulder 26 that extends entirely across the picker head and is of sufficient extent to engage the butts of two short butt needles thereby to lower said two needles and effect the widening of the fabric at that side to the extent of one needle in the heel and in the toe. The widening picker 23 is, however, provided with a head 27 that has a notch or shoulder 28 extending only half way across the said head as most clearly indicated in Fig. 8, the outer portion or part furthest removed radially from the axis of the needle cylinder being filled in as indicated at 29. The effect of this construction, as will be more particularly described hereinafter, is to cause the engagement by the said widening picker 23 of but one needle, namely, the short butt of the endmost toe needle, the filled in portion 29 being struck by the adjoining needle, which is the first of the long butt or instep needles, with the result that said long butt needle is not lowered into action but rides above the said picker as the latter moves downwardly with the said short butt needle. The result is that but a single needle is brought down into action and this merely offsets the single needle that was lifted out of action just previous thereto. Thus no narrowing or widening occurs through the action of the said widening picker 23 when forming the toe, but on the contrary a non-fashioned, selvage edge is formed that is afterward seamed up so as to make a straight non-fashioned seam along the side of the great toe.

The bracket 20 is preferably similar in construction and position to the corresponding part in the Banner machine and is preferably provided with a cam 30 to effect the truing of the needle butts and also is provided with what I may term a butterfly cam 31, similar generally it may be to the corresponding part in the said Hemphill patent No. 933,443 and adapted to be controlled in vertical position by means of a rod 32 which, as most clearly shown in Figs. 1, 7 and 8, rests at its lower end upon a lever 33 pivoted upon a bracket 34 at 35, as most clearly shown in Fig. 6. At its outer end, the lever 33 is pivotally connected at 36 to the upper end of a rod 37, which at its lower end is pivotally connected at 38 to a lever 39 pivoted at 40 and bearing upon a suitable peripheral or other cam upon the cam drum 7.

The construction and operation of parts are such that during the narrowing operation in the knitting of the heel and the toe, the said butterfly cam 31 is depressed through the proper positioning of the lever 33 with the result that the widening pickers 23, 24 are drawn down at their inner ends out of operative relation to the needles. At such times, therefore, only the narrowing pickers operate.

In the so-called Banner machine, a part corresponding generally to the butterfly cam 31 was provided, and was so operated as to hold the widening pickers down in inoperative position during the narrowing of both the heel and the toe, with the result that both the heel and the toe were narrowed in a manner well known and not necessary to describe in detail.

In the said Banner machine, means were provided to elevate at the proper time the part generally corresponding to the butterfly cam 31 so as to permit the widening pickers 23, 24 to swing upwardly under the influence of their springs into operative relation with the needles and so as thereafter to bring down into action two needles at each end of the series of the heel and toe needles in the reciprocating operating, and so long as the widening operation continues.

In accordance with my invention, I provide means for separately controlling the widening pickers 23, 24. This I preferably do in order that the widening picker 23,—that is, the widening picker having the filled in portion 29,—is brought into action during the narrowing of the toe pocket. The said picker 23 is so located as to operate at the great toe side of the toe pocket and being brought into action during the narrowing of the toe pocket, the result is that as the narrowing picker 15 elevates a needle at the end of the series at the great toe side of the toe pocket at the commencement of the narrowing, the said needle is immediately thereafter restored to action by the widening picker 23 which as stated has been permitted to function during narrowing.

Figure 2:
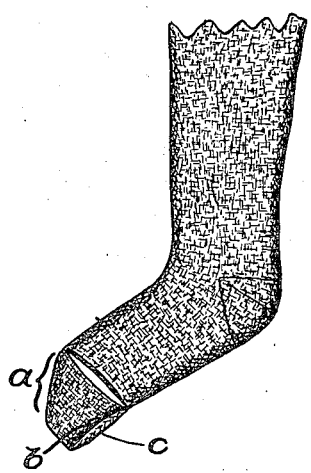
Fig. 2 is a perspective view of a lower part of a stocking or sock knitted in accordance with my invention.
Figure 3:
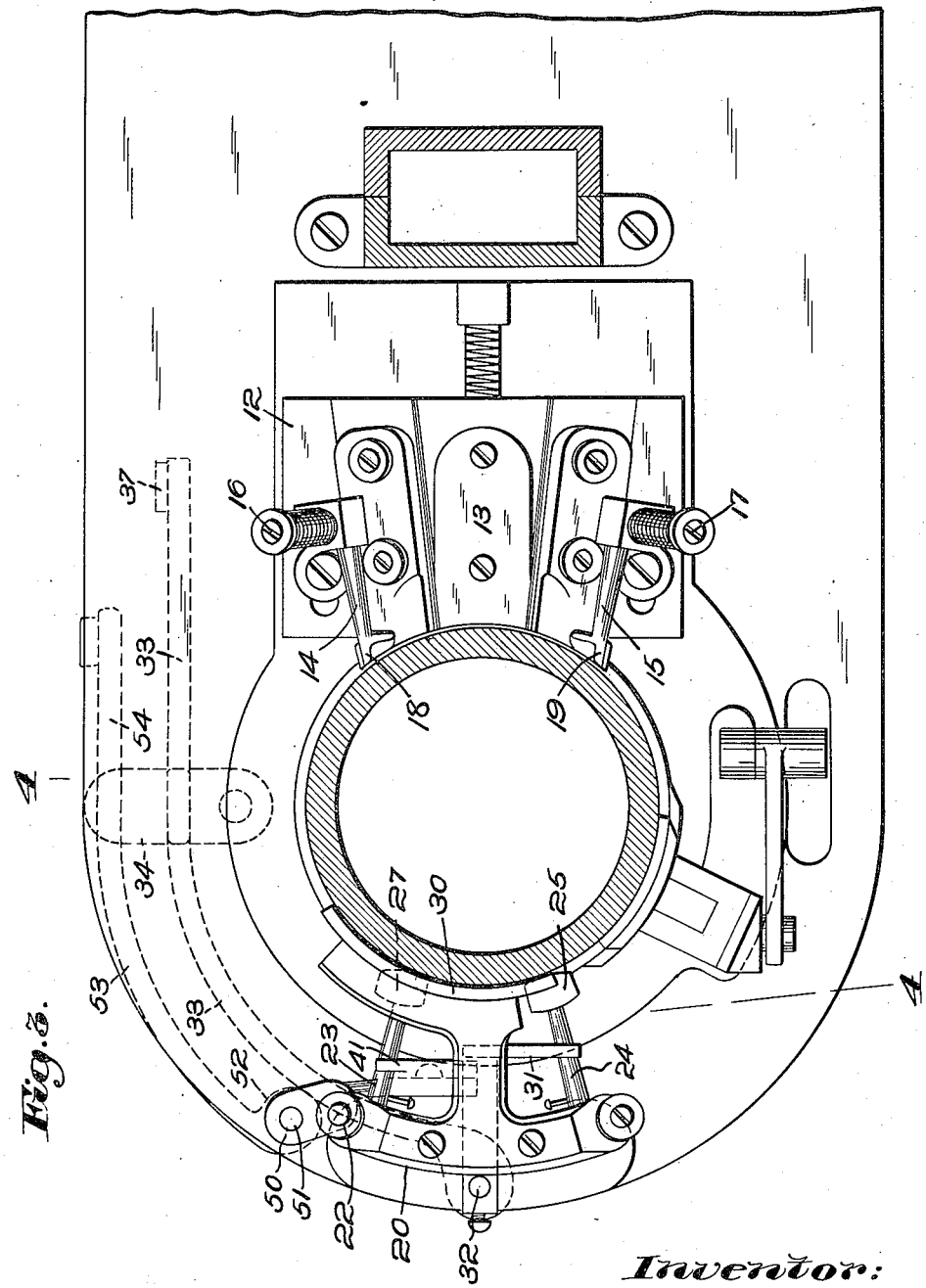
Fig. 3 is a transverse section upon the line 3—3 of Fig. 1.

The result is therefore, as diagrammatically indicated in Fig. 13, that in the narrowing action upon the toe pocket the narrowing picker 14 lifts the needle 1 out of action and that needle remains up and as the narrowing continues, the said narrowing picker 14 continues to throw up single needles until all the needles in the bracket $a$ are thrown up, and hence to narrow the toe along the side $a$ of Fig. 2. The narrowing picker 15 also throws up a needle, being the end needle 1' at the other end of the series and next to the last needle of the long butt or instep needles. This, however, does not result in a narrowing of the toe at the great toe side of the toe pocket, since the very same needle 1' is immediately thereafter restored to action by the widening picker 23. Thus, at the great toe side of the toe pocket a straight, non-fashioned, selvage edge $b$ is formed. It will thus be understood that there is a resulting neutralization of the effect of a widening member and a narrowing member at the great toe side of the toe of the stocking.

I will now describe one form of means for bringing into action the widening picker 23 during the narrowing of the toe. Obviously, however, my invention is not limited to such means, as any other suitable means for the same general purpose may be provided.

Instead of forming the butterfly cam 31 as a single piece, I form the same in two parts, namely, the left hand part viewing Fig. 7 numbered 31 and secured to the vertical rod 32 and the right hand part viewing said figure, and indicated at 41. The part 41 is formed as a plate or slide mounted for vertical sliding movement upon the face of the bracket 20 which may be machined to provide a straight surface. The plate 41 is here shown as provided with two vertical slots 42, 42 receiving the heads of screws 43 tapped into the bracket 20 and constituting means for guiding the plate 41 in its vertical movement. Preferably I provide a coiled spring 44 connected to a pin 45 upon said plate at one end and to a pin 46 upon the bracket 20 at its other or lower end and tending normally to depress the said plate 41. At its upper end the said plate 41 is provided with a projection or shoulder 47 which as clearly shown in Fig. 7 is adapted to rest upon the adjacent upper end of the butterfly cam 31.

In order to elevate the plate 41 I provide any suitable means. Herein for the purpose I have represented it as having a laterally extending pin 48 secured in a slot or recess 49 in a head 50 fast upon the upper end of a vertical rod 51. As shown most clearly in Fig. 5, the lower end of the rod 51 rests upon the lower end 52 of a lever 53 pivoted upon the stud 35 of the bracket 34. Said lever has an arm 54 pivoted at 55 to the upper end of a rod 56 which as shown most clearly in Fig. 1 is itself pivotally connected at its lower end at 57 to the outer end of a lever 58 pivoted at 40 and having an inner end 59 adapted to rest upon the disk 8 and to be acted upon by the peripherally arranged cam 9. Connected to the lever 58 at 60 is a coil spring 61, the upper end of which is connected to a suitable pin 62 upon the framing of the machine whereby the inner end 59 of the lever is held in engagement with the cam 9.

I have already stated that during the narrowing operation, that is, while the toe pocket is being fashioned along the side $a$ and is being formed with a straight, unfashioned, selvaged edge along the side $b$, the widening picker 23 is brought into action so that each time the end needle of the short butt series is elevated out of action by the narrowing picker 15, it is immediately returned to action by the widening picker 23, thus preventing the fashioning of the toe pocket at the side $b$.

When, now, the widening of the toe pocket is begun the narrowing picker 14 remains in action in this embodiment of my invention and elevates a needle at the side $a$ of the toe pocket, but the widening picker 24 immediately throws down into action two needles and hence effects a widening to the extent of one needle, this operation being continued throughout the widening action in the formation of the toe pocket, with the result that the toe is fashioned by a widening operation at the side *a*. At the other side of the toe pocket, however, the narrowing picker 15 elevates one needle upon each reciprocation, but the widening picker 23 throws down only one needle at each reciprocation, and therefore a straight selvage, non-fashioned formation is effected, thus constituting an opening *c* (Fig. 2), to be afterwards seamed together along the great toe side of the toe pocket.

During the widening operation and in order to permit the two pickers 23, 24 to function, the butterfly cam 31 is elevated by the lever 33 and the slide 41 is maintained elevated by the lever 53 or it may be lifted by the engagement of the upper end of the butterfly cam with the shoulder 47 of the slide 41 depending upon the timing of the parts. In either case, the two widening pickers 23, 24 are permitted to function, but with the result that widening is effected at one side only of the toe pocket.

In Fig. 6, I have indicated diagrammatically the knitting cam and have also indicated in full lines and in dotted lines the successive positions of the narrowing picker 15 and of the widening picker 23. Viewing said diagram, it will be evident that during reciprocating knitting when the needles are moving to the left viewing Fig. 6, the leading short butt needle will strike the narrowing picker 15 at the full line position of the latter and will be immediately elevated thereby to the dotted line position of said picker. Upon return reciprocation of the needle cylinder the same short butt needle will strike the widening picker 23, which is now elevated or in the dotted line position, and will be depressed thereby into the full line position indicated in said figure, whereby it is restored to action. As already stated, the next adjoining needle of the long butt series will ride over the top of the widening picker 23 because of the filled in portion 29 thereof.

In that form of my invention shown in Figs. 1 to 8 inclusive, I have represented a construction whereby a stocking will be knitted for the right foot. Obviously within the scope of my invention, means may be provided to form a stocking for the left foot and the same machine may be arranged to make either a right foot or a left foot stocking and within the scope of my invention I may provide means whereby automatically or otherwise right or left stockings may be knitted in alternation or otherwise. If desired I may provide means whereby upon simple change or adjustment the machine may be constructed to form either a right foot or a left foot stocking.

In Figs. 9, 10, 11 and 12, I have shown one form of means for effecting this result. In said figures and viewing particularly Fig. 10, I have represented at the right side thereof means substantially identical with that already described for so acting upon the pickers as to form a toe pocket fashioned as already described, that is, one for the right foot only. At the left side of said figure, I have indicated essentially the same means for so operating the pickers as to effect the formation of a toe pocket for the left foot only, that is to say, one narrowed and widened along the little toe side of the left foot and provided with a straight, selvaged, non-fashioned formation on the great toe side thereof. In the said figures 9, 10 and 11 I have indicated the corresponding parts by the same reference numerals accompanied by a prime. It is therefore unnecessary to describe the further operation of the parts in detail.

In such construction, two levers are provided, namely, 58 and 58′ (see Fig. 12) and either one as the case may be is adapted to be brought into operative relation at its inner end 59, 59′ with a suitable cam 9 upon the disk 8, it being understood that the said cam is shifted to the position indicated in dotted lines at 9′ to co-act with the lever 58′. In order to knit a right foot stocking, the operation is the same as in that form of my invention shown in Figs. 1 to 8, namely, at the little toe side the narrowing picker lifts one needle and the widening picker depresses two needles, thus widening to the extent of one needle. To knit a left foot stocking, the widening picker construction is obviously reversed; that is to say, at the great toe side of the stocking, a narrowing picker lifts one needle and the widening picker depresses that identical needle and no more, since the widening picker there used is formed like the widening picker 23. At the little toe side, the narrowing picker lifts one needle and the widening picker, which is constructed like the widening picker 24, depresses two needles, thus widening to the extent of one needle. The change in widening pickers having been made before beginning the knitting of the left foot stocking, the cam 9 is shifted, as stated, and the left foot stocking is knitted following the knitting of the right foot stocking.

While I have shown one form of picker means whereby the object of my invention may be carried out, it is clearly to be understood that my invention is not limited in scope to the disclosed embodiment of means. While I have, as the specific embodiment of my invention, disclosed means for forming a toe pocket fashioned at one side thereof and non-fashioned at the other side thereof, it is evident that my invention is not restricted in its use to such formation of a toe pocket, inasmuch as the invention may be employed in the production of any knitted fabric that is to be fashioned at one edge and non-fashioned at the opposite edge. Obviously, however, my invention is of peculiar advantage when employed in the production of toe pockets upon a stocking or hose.

Having thus described one illustrative embodiment of my invention, I desire it to be understood that although specific terms are employed, they are used in a generic and descriptive sense and not for purposes of limitation, the scope of the invention being set forth in the following claims.

Claims

1. A circular hosiery knitting machine having a relatively rotatable needle cylinder and cam ring, and means for automatically imparting such relative movement, narrowing and widening pickers having fixed stations with respect to the cam ring but having needle elevating and depressing movements at their fixed stations, and means for automatically controlling said pickers, so as to form a stocking or hose having fashioned heel gores, and a toe pocket fashioned at one edge only of said toe pocket.

2. A circular hosiery knitting machine having a relatively rotatable needle cylinder and cam ring, and means for automatically imparting such relative movement, narrowing and widening pickers having needle elevating and depressing movements, and means for automatically controlling said pickers, so as to form a stocking or hose having fashioned heel gores, and a toe pocket fashioned at one edge only of said toe pocket.

3. A circular hosiery knitting machine having a relatively rotatable needle cylinder and cam ring, and means for automatically imparting such relative movement, and means for automatically imparting relative reciprocatory movement for the formation of the heel and toe pockets, narrowing and widening pickers having fixed stations with respect to the cam ring, but having needle elevating and depressing movements at their fixed stations, and means for automatically controlling the said pickers, so as to form a stocking or hose having fashioned heel gores, and a toe pocket fashioned along one edge only of said toe pocket.

4. A circular hosiery knitting machine having a relatively rotatable needle cylinder and cam ring, and means for automatically imparting such relative movement, and means for automatically imparting relative reciprocatory movement for the formation of the heel and toe pockets, narrowing and widening pickers having needle elevating and depressing movements, and means for automatically controlling the said pickers, so as to form a stocking or hose having fashioned heel gores, and a toe pocket fashioned along one edge only of said toe pocket.

5. A circular hosiery knitting machine having a relatively rotatable needle cylinder and cam ring, and means for automatically imparting such relative movement, a pair of narrowing pickers and a pair of widening pickers having needle elevating and depressing movements, and means for automatically controlling the said pickers, so as to form a stocking or hose having fashioned heel gores, and a toe pocket fashioned along one edge only of the said toe pocket.

6. A circular hosiery knitting machine having a relatively rotatable needle cylinder and cam ring, and means for automatically imparting such relative movement, means for automatically imparting relative reciprocating movement to said needle cylinder and cam ring for the formation of the heel and toe pockets, a pair of narrowing pickers and a pair of widening pickers having fixed stations with respect to the cam ring, but having needle elevating and depressing movements at their fixed stations, and means for automatically controlling the said pickers so as to form a stocking or hose having fashioned heel gores, and a toe pocket fashioned along one edge only of the said toe pocket.

7. A circular hosiery knitting machine having a relatively rotatable needle cylinder and cam ring, and means for automatically imparting such relative movement, a cam shaft, narrowing and widening pickers having needle elevating and depressing movements, and means controlled from said cam shaft for so governing the pickers during the formation of the toe pockets as to fashion the toe pockets at the little toe side thereof only.

8. A circular hosiery knitting machine having a relatively rotatable needle cylinder and cam ring, means for automatically imparting such relative movement, narrowing and widening pickers having fixed stations with respect to the cam ring, but having needle elevating and depressing movements at their fixed stations, a cam shaft, and means controlled by said cam shaft for so governing the said pickers as automatically to form a stocking or hose having fashioned heel gores, and a toe pocket fashioned along one edge only of the said toe pocket.

9. A circular hosiery knitting machine having a relatively rotatable needle cylinder and cam ring, means for automatically imparting such relative movement, narrowing and widening pickers having needle elevating and depressing movements, a cam shaft having cam means thereon, and connections from said cam means controlling said pickers so as to form toe pockets fashioned at the little toe side only.

10. A circular hosiery knitting machine having a relatively rotatable needle cylinder, and cam ring, means for automatically imparting such relative movement, a plurality of widening pickers, and means separately and automatically to control the periodicity of action of said plurality of widening pickers as to form a toe pocket widened along one edge only thereof.

11. A circular hosiery knitting machine having a relatively rotatable needle cylinder and cam ring, and means for automatically imparting such relative movement, narrowing and widening pickers and separately acting means governing said widening pickers to move said widening pickers down into inoperative position and to control the periods of elevation thereof into active position, thereby to effect the widening of the toe pocket at one edge only thereof.

12. A knitting machine having knitting cams and two widening pickers, one of which at its needle-engaging end is notched for the reception of the heels of two adjacent needles, and the other of which is notched for the reception of the heel of a single needle only.

13. A knitting machine comprising in combination knitting cams and two widening pickers, one being constructed and arranged to bring into action a plurality of needles at a single functioning thereof, and the other being constructed and arranged to bring into action a single needle only at a single functioning thereof.

14. A knitting machine having knitting cams and two widening pickers, one picker being constructed and arranged to depress two adjacent needles into action at each functioning of the picker, and the other picker being constructed and arranged to depress a single needle only into action at each functioning thereof.

15. A hosiery knitting machine having two widening pickers, one being constructed and arranged to operate at the little toe side of the toe pocket and the other being constructed and arranged to operate at the great toe side thereof, one of said pickers being constructed and arranged to bring into action a plurality of needles at a single functioning thereof, and the other picker being constructed and arranged to bring into action a single needle only at a single functioning thereof.

16. A circular hosiery knitting machine having a relatively rotatable needle cylinder and cam ring, and means for automatically imparting such relative movement, narrowing pickers and a plurality of widening pickers, and individual means for respectively and automatically controlling the elevation of said widening pickers into operative position, whereby a toe pocket is formed fashioned along one edge only thereof.

17. A circular hosiery knitting machine having relatively rotatable needle cylinder and cam ring, and means for automatically imparting such relative movement, narrowing pickers and a plurality of widening pickers, and a plurality of differentially acting means respectively and automatically controlling the movement of said widening pickers into operative position, whereby a hose or stocking is formed having a toe fashioned at one edge only thereof.

18. Knitting mechanism including in combination, knitting cams, narrowing pickers and widening pickers, and means automatically cooperating therewith respectively to effect widening at one side of a knitted fabric and the formation, by resulting neutralization of narrowing and widening pickers thereat of a straight, non-fashioned, selvaged edge at the other side of the knitted fabric.

19. Knitting mechanism comprising in combination, knitting cams, a pair of narrowing pickers, means automatically to control the operation of the same so as at the toe pocket to narrow the fabric at one side and so that a non-narrowed selvage edge is formed at the other side, widening picker mechanism and co-acting means automatically to control the action of the same to widen the fabric at one side of the toe pocket and so that a non-widened, selvage edge is formed at the opposite side of said toe pocket.

20. Knitting mechanism comprising in combination, a series of long and short butt needles, knitting cams to act thereon, a pair of narrowing pickers, means to retain the narrowing pickers in action during the formation of the toe pocket, widening pickers, and means to effect cooperation between said widening pickers and said narrowing pickers to widen the toe pocket upon one side but upon the opposite side to prevent the formation of a narrowed edge by returning the same needle constantly into action during the narrowing operation at the other side of the toe pocket and during the widening operation to effect the formation of a non-widened edge.

21. Knitting mechanism comprising in combination, knitting cams, long and short butt needles arranged in two semi-circular series, a pair of narrowing pickers, means to retain them in action during both narrowing and widening, a pair of widening pickers, one being notched to lower two needles into action at each functioning thereof, the other being notched to lower a single needle into action at each functioning thereof, and means separately to control the periods of action of said widening pickers, whereby a fabric is formed that is narrowed and widened at one edge and is non-fashioned and selvaged at the opposite edge.

22. Knitting mechanism comprising in combination, knitting cams, a pair of narrowing pickers, a pair of widening pickers, separate means to render said widening pickers inactive, and means whereby one of said widening pickers is brought into action during the narrowing operation, so as constantly to restore to action the needle acted upon by the co-related narrowing picker whereby a straight, non-narrowed edge is made at one side of the fabric and a narrowed edge at the opposite side thereof.

23. Knitting mechanism comprising in combination, a set of knitting cams, a pair of narrowing pickers, a pair of widening pickers, and means to cause one of said widening pickers to function with the co-related narrowing picker, whereby a fabric is produced that is non-narrowed at one edge thereof through the co-related action of said narrowing and widening picker, but is narrowed at the opposite side thereof.

24. A knitting machine having automatically acting means to form a knitted fabric which is automatically fashioned along one edge only, automatically acting controlling means therefor and having automatically acting means for forming a subsequent fabric automatically fashioned along the other edge only, automatically acting controlling means therefor, and means for rendering one only of said controlling means active and then for rendering the other only of said controlling means active.

25. A knitting machine having automatically acting means including picker means to form a knitted fabric fashioned along one edge only and having automatically acting means including picker means for forming a subsequent fabric fashioned along the other edge only, controlling means for said fashioning means respectively and means for rendering said controlling means alternately operative.

26. Knitting mechanism comprising in combination, a series of long and short butt needles, knitting cams to act thereon, a pair of narrowing pickers, means to retain the narrowing pickers in action during the formation of a gusset portion of the fabric, widening pickers, means to effect cooperation between the widening pickers and the narrowing pickers to widen the said gusset portion upon one side, but upon the opposite side to prevent the formation of a narrowed edge by returning the same needle constantly into action during the narrowing operation at the other side of the said gusset portion and during the widening operation to effect the formation of a non-widened edge.

27. Knitting mechanism comprising in combination, knitting cams, long and short butt needles arranged in two semi-circular series, a pair of narrowing members, means to retain them in action during both narrowing and widening, a pair of widening members, one having means to move two needles into action at each functioning thereof, the other having means to move a single needle into action at each functioning thereof, and means separately to control the periods of action of said widening members, whereby a fabric is formed that is narrowed and widened at one edge and that is non-fashioned and selvaged at the opposite edge.

28. Knitting mechanism comprising in combination, knitting cams, a pair of narrowing members, a pair of widening members, separate means to render said widening members inactive, and means whereby one of said widening members is brought into action during the narrowing operation so as constantly to restore to action the needle acted upon by the co-related narrowing member, whereby a separate non-narrowed edge is made at one side of the fabric and a narrowed edge is made at the opposite side thereof.

29. A circular hosiery knitting machine having a needle cylinder and a cam ring, the latter having knitting cams and picking devices operating respectively at the little toe side and great toe side of the toe pocket, together with means automatically so to co-relate the operation of said picking devices, that widening is effected at the little toe side, but a straight, non-fashioned edge is made at the great toe side.

30. A circular hosiery knitting machine having a needle cylinder and a cam ring with knitting cams and picker mechanism constructed and arranged automatically to form the heel pocket by narrowing and widening and also to effect widening at the little toe side of the toe pocket and co-acting means coordinated with said picker mechanism to effect formation of a straight, non-fashioned selvage at the great toe side of said toe pocket.

31. A knitting machine having means including picker means to form a fabric fashioned along one edge only, controlling means for said means including said picker means, and means including picker means for forming a subsequent fabric fashioned along the other edge only, controlling means for such means including such picker means, and means for rendering one only of said controlling means active and then for rendering the other one of said controlling means active.

32. A knitting machine having means including widening picker means and narrowing picker means to form a knitted fabric fashioned along one edge only, controlling means for said means and said narrowing and widening picker means so as to effect the described fashioning, and means including widening picker means and narrowing picker means for forming the subsequent fabric fashioned along the other edge only, controlling means for such means and including said narrowing picker means and widening picker means, and means for rendering one only of said controlling means active and then for rendering the other only of said controlling means active.

33. A knitting machine having means including a narrowing picker and widening means to form a knitted fabric fashioned along one edge only, controlling means for such means, means including another narrowing picker and cooperating widening means for forming the subsequent fabric fashioned along the other edge only, controlling means for such means and means for rendering one only of said controlling means active, and then for rendering the other only of said controlling means active.

34. A knitting machine having means including a norrowing picker and a widening picker to form a knitted fabric fashioned along one edge only, controlling means for said means and including said pickers for the purpose stated, means including another narrowing picker and another widening picker for forming the subsequent fabric fashioned along the other edge only, controlling means for such means including said narrowing picker and said widening picker to effect the described fashioning, and means for rendering one only of said controlling means active and then for rendering the other only of said controlling means active.

35. A circular, hosiery knitting machine having a needle cylinder and a cam ring, the latter having knitting cams and two narrowing pickers and two widening pickers, said pickers respectively operating at the little toe side and great toe side of the toe pocket, together with means automatically so to co-relate the operation of the said narrowing pickers and widening pickers at the two sides that widening is effected at the little toe side, but a straight non-fashioned edge is made at the great toe side.

In testimony whereof, I have signed my name to this specification.

FRANK E. JONES.